(12) United States Patent
Ishikawa et al.

(10) Patent No.: US 7,460,772 B2
(45) Date of Patent: Dec. 2, 2008

(54) OPTICAL APPARATUS

(75) Inventors: Masanori Ishikawa, Saitama (JP); Jun Sugita, Sagamihara (JP); Mitsuru Shinohara, Hokuto (JP); Yuki Nagao, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 317 days.

(21) Appl. No.: 11/150,032

(22) Filed: Jun. 10, 2005

(65) Prior Publication Data
US 2005/0276590 A1 Dec. 15, 2005

(30) Foreign Application Priority Data
Jun. 15, 2004 (JP) ............................. 2004-177301

(51) Int. Cl.
*G03B 17/00* (2006.01)
(52) U.S. Cl. .............................. 396/52; 396/53; 396/55
(58) Field of Classification Search ................... 396/55, 396/13, 52, 421; 359/554, 555, 813; 348/208.11, 348/208.99, 341
See application file for complete search history.

(56) References Cited

U.S. PATENT DOCUMENTS

| 5,155,520 A | 10/1992 | Nagasaki | 396/53 |
| 5,649,237 A | 7/1997 | Okazaki | 396/55 |
| 5,771,404 A * | 6/1998 | Katayama et al. | 396/52 |
| 5,774,266 A * | 6/1998 | Otani et al. | 359/554 |
| 5,794,078 A * | 8/1998 | Okazaki | 396/50 |
| 5,890,018 A | 3/1999 | Terui | |
| 5,937,214 A | 8/1999 | Shintani et al. | |
| 2004/0136704 A1* | 7/2004 | Usui | 396/55 |
| 2004/0240867 A1* | 12/2004 | Hara | 396/55 |
| 2005/0129392 A1* | 6/2005 | Shinohara | 396/50 |

FOREIGN PATENT DOCUMENTS

| JP | 3-210884 A | 9/1991 |
| JP | 7-225405 A | 8/1995 |
| JP | 9-218435 A | 8/1997 |

* cited by examiner

*Primary Examiner*—Melissa J Koval
(74) *Attorney, Agent, or Firm*—Canon USA Inc IP Division

(57) ABSTRACT

An optical apparatus is provided which uses image shake information generated by a shake correction unit to improve an image by reducing the amount of image shake.

19 Claims, 3 Drawing Sheets

OPTICAL APPARATUS

BACKGROUND OF THE INVENTION

1. Field of the Invention

The present invention generally relates to an optical apparatus and in particular but not exclusively an optical apparatus having a function of improving image shake.

2. Description of the Related Art

Many optical apparatuses, (e.g., cameras and interchangeable lenses), have vibration isolation systems for reducing image shake caused by hand motion or the like.

Hand motion is normally a vibration with a frequency of about 1 to 10 Hz. In an optical apparatus having a typical vibration isolation system for taking a picture without blurring even when hand motion occurs during exposure, vibration of the optical apparatus is detected. Then, a correcting lens is moved along a plane perpendicular to an optical axis in accordance with the detection result (optical vibration isolation), or an area to be extracted (output) from a shot image is shifted in accordance with the detection result (electronic vibration isolation).

The vibration caused by hand motion or the like is determined by detecting an acceleration, an angular acceleration, an angular velocity, an angular displacement, etc., with a laser gyroscope or the like and performing calculations based on the detection results. Then, the image shake is improved by driving the correcting lens or shifting the output area in the shot image on the basis of shake information obtained by the calculations.

In general, when a shooting magnification is 0.1 or less, the image shake can be sufficiently corrected simply by correcting angular shake in a direction an imaging plane tilts. However, when the shooting magnification is more than 0.1, the influence of parallel shake along the imaging plane is relatively large. In addition, as the shooting magnification increases, the influence of shake in a focal direction (direction of a shooting optical axis) also increases. This is because the parallel shake causes an image shift proportional to the shooting magnification on the image plane and the shake in the focal direction (hereafter called focal shake) causes a focus shift proportional to the square of the shooting magnification.

Accordingly, in optical apparatuses, (e.g., ones having macro lenses and having high shooting magnifications), the parallel shake may be corrected by controlling an optical shake correction unit using an acceleration sensor.

On the other hand, an acceleration detected by an acceleration sensor includes both the acceleration caused by the parallel shake and the acceleration of gravity. In addition, in order to calculate the velocity and displacement from the detected acceleration, it is necessary to determine an accurate initial velocity. For this purpose, Japanese Patent Laid-Open No. 9-218435 discloses a method described below.

First, a direction of gravitational acceleration is measured for a predetermined time interval, and an average direction of gravitational acceleration is determined from the average of the detection result. Then, a displacement in an angular direction is determined from the output of an angular velocity sensor, and a displacement in the direction of gravitational acceleration is calculated. Then, a shake acceleration is calculated by subtracting the gravitational acceleration from the detected acceleration.

The above-mentioned Japanese Patent Laid-Open No. 9-218435 also discloses a method for calculating a velocity using an acceleration between a first peak and a last peak within a predetermined time interval of the acceleration detected by the acceleration sensor by assuming that a shake displacement is the same between the first and last peaks.

In addition, methods for directly determining the shake displacement from the displacement of the image are also suggested. For example, camera shake can be detected from the shake of the image on an AF sensor.

In conventional methods, in which the shake displacement is calculated from the acceleration, it is necessary to determine the direction of gravity by measuring the acceleration for a long time. Therefore, it requires a long time to obtain the shake displacement, which reduces the snap-shooting ability of shooting apparatuses.

In addition, in this method, the initial velocity is calculated on the basis of the assumption that the camera shake is a periodic motion. However, the actual camera shake is not periodic, and therefore the calculated initial velocity includes a large error.

As described above, the camera shake displacement may also be determined from the output of a photoelectric transducer, such as an AF sensor, and the image shake may be corrected on the basis of only the thus detected camera shake displacement. However, when this method is applied to a single lens reflex camera, although high correction accuracy can be obtained, the camera shake cannot be detected during exposure. This is because a quick return mirror is removed from a shooting optical path and an object image is not formed in the AF sensor during exposure.

SUMMARY OF THE INVENTION

At least one exemplary embodiment provides an optical apparatus which can be applied to a signal lens reflex camera and which performs image shake correction with increased accuracy in a short time.

According to at least one exemplary embodiment, an optical apparatus includes a shake correction unit which improves image shake caused by vibration and a controller which generates shake information (e.g., using a first signal and a second signal), the first signal being obtained by detecting an acceleration of the vibration and the second signal being obtained by detecting a displacement of the vibration. In addition, the controller controls the operation of the shake correction unit on the basis of the shake information.

According to at least one exemplary embodiment, an optical apparatus includes a shake correction unit which improves image shake caused by vibration and a controller which generates shake information (e.g., using a first signal and a second signal), the first signal can be generated using an inertial force generated by the vibration and the second signal being generated by detecting a displacement of a light beam caused by the vibration. In addition, the controller controls the operation of the shake correction unit on the basis of the shake information.

According to at least one exemplary embodiment, a gravitational acceleration component can be reduced from a shake acceleration represented by the first signal using a correction value calculated on the basis of a second signal. In addition, an initial velocity used for obtaining a shake velocity and a shake displacement from the shake acceleration represented by the first signal can be calculated on the basis of the second signal. Thus, the shake information can be obtained using both the first and second signals. Therefore, shake of the optical apparatus including angular shake, parallel shake, and focal shake can be more accurately and quickly detected.

In addition, when the improved shake acceleration, using the correction value calculated, is stored before shooting, the image shake correction can be performed with increased accuracy during shooting.

Further features of at least one exemplary embodiment will become apparent from the following description of exemplary embodiments with reference to the attached drawings.

DESCRIPTION OF THE EMBODIMENT

The following description of at least one exemplary embodiment is merely illustrative in nature and is in no way intended to limit the invention, its application, or uses.

Processes, techniques, apparatus, and materials as known by one of ordinary skill in the art may not be discussed in detail but are intended to be part of the enabling description where appropriate. For example optical photographic systems are discussed and any material that can be used to form elements of optical photographic systems should fall within the scope of exemplary embodiments (e.g. glass, Si). Additionally the actual size of the elements of optical photographic systems or other elements of exemplary embodiments may not be discussed, however any size from macro to micro and nano are intended to lie within the scope of exemplary embodiments (e.g. lenses with diameters of nanometer size, micro size, centimeter, and meter sizes). Additionally exemplary embodiments are not limited to visual optical systems, for example the system can be designed for use with infrared and other wavelength systems.

Examples of several exemplary embodiments are described below with reference to the accompanying drawings.

Figure 1:
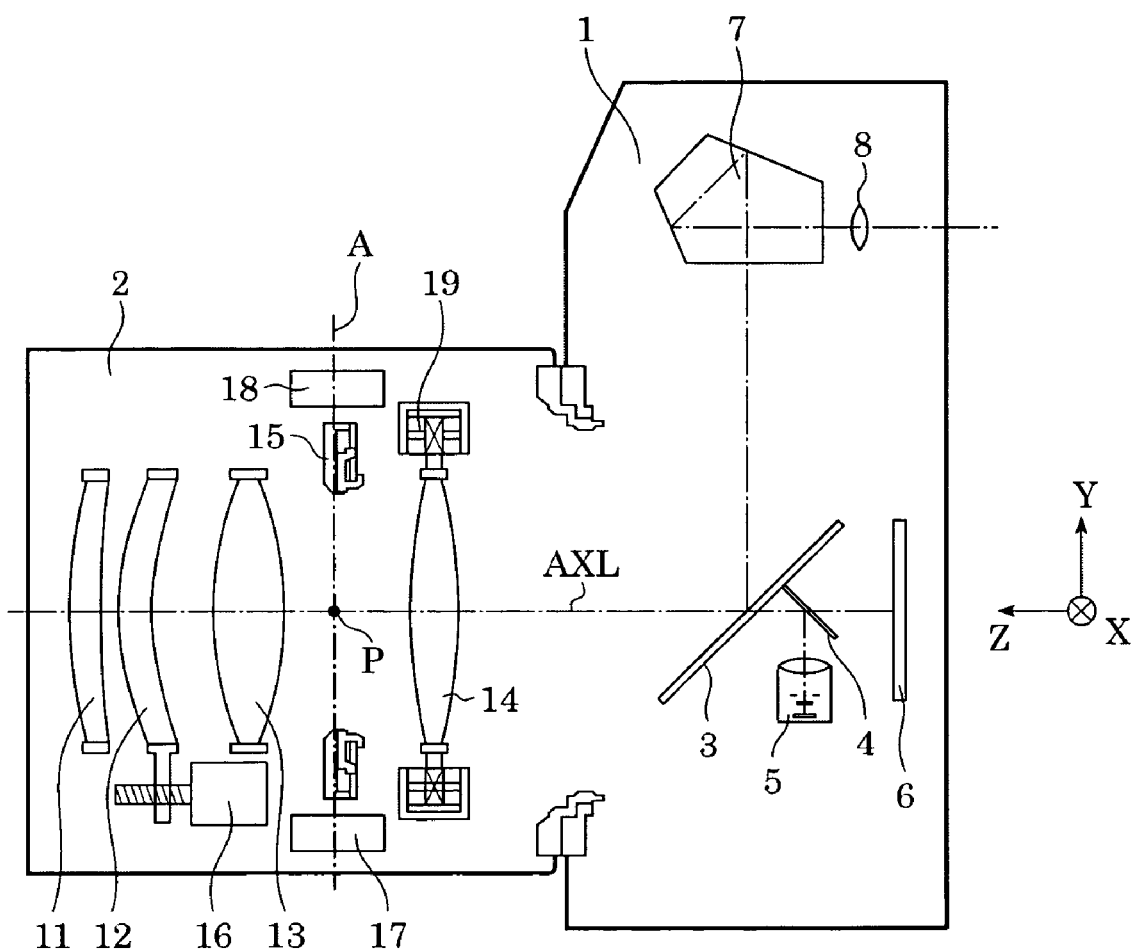
FIG. 1 illustrates a sectional view showing a digital single lens reflex camera with an interchangeable lens according to at least one exemplary embodiment.

FIG. 1 illustrates a sectional view of a digital single lens reflex camera with an interchangeable lens, which is an optical apparatus according to at least one exemplary embodiment. In FIG. 1, a direction of a lens optical axis (shooting optical axis) AXL is defined as the Z direction, a direction perpendicular to the lens optical axis AXL and extending horizontally in a plane parallel to an imaging plane is defined as the X direction, and a direction perpendicular to the lens optical axis AXL and extending vertically in the plane parallel to the imaging plane is defined as the Y direction.

An interchangeable lens 2 is attached to a camera body 1 (hereafter simply called a camera). The camera 1 includes a main mirror 3, which is placed, in the state before shooting, on an optical path of a light beam from the interchangeable lens 2. The main mirror 3 guides a part of the light beam to a finder optical system (7 and 8) and transmits the remaining part of the light beam. In this state, a sub mirror 4 is disposed behind the main mirror 3 to reflect the light beam, which passes through the main mirror 3 toward a focus detection unit 5. The main mirror 3 and the sub mirror 4 are removed from the optical path during shooting.

The focus detection unit 5 can include a condenser lens which splits the incident light beam into two light-beam components, two separator lenses which re-focus the two light-beam components, and an AF sensor having line sensors, (e.g., charge coupled device (CCD) sensors), which perform photoelectric conversion of the two re-focused object images. The focus detection unit 5 performs focus detection (detection of focus state of the interchangeable lens 2) by a so-called phase difference detection method. The line sensors are arranged in a cross shape to detect positions of an object image in a vertical direction (Y direction) and a horizontal direction (X direction). The AF sensor included in the focus detection unit 5 may include a two-dimensional area sensor instead of the line sensors. The image detected by the AF sensor moves in accordance with the vibration of the camera. Accordingly, the vibration can be directly detected by determining the displacement of the image during vibration.

An imaging device 6 (e.g., a CCD sensor or a complementary metal oxide semiconductor (CMOS) sensor, equivalents and other imaging devices as known by one of ordinary relevant skill in the art) and the light beam from the interchangeable lens 2 forms an image on a light-receiving surface (imaging plane) of the imaging device 6. The imaging device 6 can perform photoelectric conversion of the object image formed on the imaging plane and can output an imaging signal. An electronic control focal plane shutter can control the amount of exposure of the imaging device 6.

In at least one exemplary embodiment, the finder optical system can include a pentaprism 7 and an eyepiece lens 8.

In at least one exemplary embodiment, the interchangeable lens 2 can include, in order from the object side: a first lens unit 11; a second lens unit 12 which can function as a focusing lens; a third lens unit 13 which can function as a variator lens; and a fourth lens unit 14 which can function as a shake-correcting lens. A diaphragm unit 15 can be disposed between the third and fourth lens units 13 and 14 to adjust the amount of light, which travels toward the camera 1. The lens units 11 to 14 and the diaphragm unit 15 form a shooting optical system.

The second lens unit (focusing lens) 12 receives a drive force from an Auto-Focus (AF) motor 16, and can move along the optical axis AXL to perform focus adjustment.

The third lens unit (variator lens) 13 receives an operating force exerted by a user and transmitted by a transmission mechanism (not shown), and moves along the lens optical axis AXL to vary the magnification.

The fourth lens unit (shake-correcting lens) 14 receives a drive force from an Isolation (IS) actuator 19, and moves in a direction perpendicular to the lens optical axis AXL to perform image-shake correction.

More specifically, first, shake information representing the shake of the camera system is generated based on a signal from an angular velocity sensor 17, (e.g., via a vibrating gyroscope), and a signal from an acceleration sensor 18. The angular velocity sensor 17 and the acceleration sensor 18 are provided in the interchangeable lens 2. The IS actuator 19 is controlled so as to drive the fourth lens unit 14 in a direction opposite to the direction of a shake displacement represented by the shake information by an amount corresponding to the shake displacement. The amount by which the fourth lens unit 14 is driven can be calculated from the shake displacement, the sensitivity of the shake-correcting lens, and other optical properties.

The acceleration sensor 18 can detect accelerations in X, Y, and Z directions. The angular velocity sensor 17 and the acceleration sensor 18 are disposed on a plane which is perpendicular to the optical axis AXL of the shooting optical system and which includes a principal point P of the shooting optical system. Accordingly, the angular velocity sensor 17 and the acceleration sensor 18 can detect an angular velocity and an acceleration, respectively, at positions corresponding to the principal point P.

Figure 2:
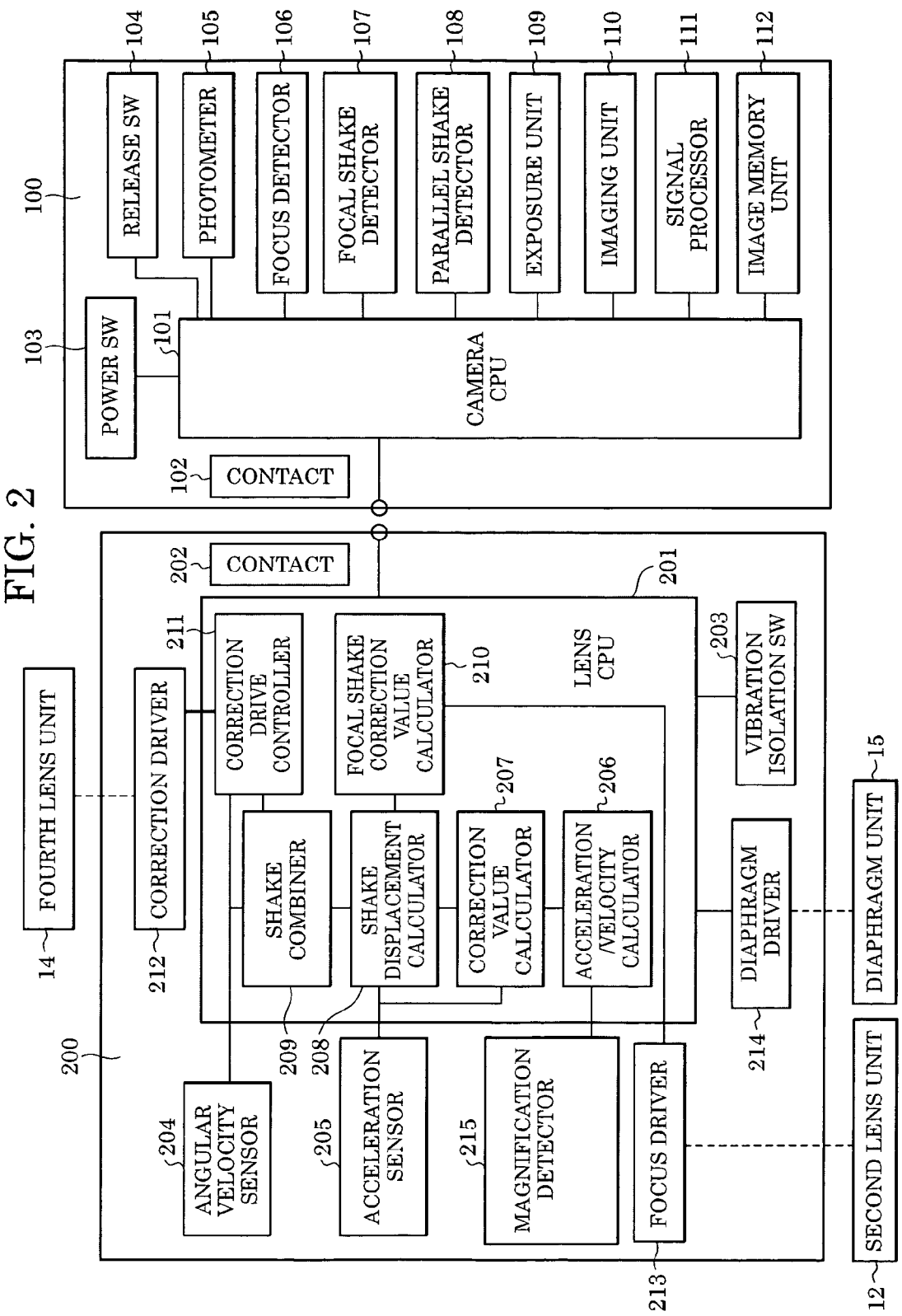
FIG. 2 illustrates a block diagram showing the structure of electric circuits in a camera system in accordance with at least one exemplary embodiment.

The IS actuator 19 is controlled by a lens central processing unit (CPU), which will be described below. The fourth lens unit 14 may rotate around a single point on the optical axis to move perpendicular to the optical axis. Alternatively, the fourth lens unit 14 may be a so-called variable apex-angle prism. FIG. 2 illustrates a block diagram showing the structure of electric circuits in the digital single lens reflex camera with the interchangeable lens illustrated in FIG. 1.

In FIG. 2, a camera electric circuit 100 is included in the camera 1, and a lens electric circuit 200 is included in the interchangeable lens 2.

The camera electric circuit 100 includes a camera CPU 101 including a microcomputer. The camera CPU 101 can control the operation of each component in the camera 1 and can communicates with a lens CPU 201 provided in the interchangeable lens 2. The communication between the camera CPU 101 and the lens CPU 201 can occur via a camera contact 102 and a lens contact 202, provided in the interchangeable lens 2 (hereafter simply called the lens 2). Information can be transmitted to the lens 2 and can include parallel shake information and focal shake information, which will be described below, and can include image magnification information.

The camera contact 102 can include a signal transmission contact section for transmitting signals to the lens 2 and a power contact section for supplying the interchangeable lens 2 with power.

A power switch 103 can be externally operated, and is used for turning on the camera CPU 101. Accordingly, actuators and sensors in the system receive power and the system is set to an operable state.

A release switch 104 can also be externally operated. The release switch 104 can be a two-stroke switch having a first stroke switch (SW1) and a second stroke switch (SW2) (not shown). Signals from the release switch 104 are input to the camera CPU 101. The camera CPU 101 prepares to perform shooting when it receives an ON signal from the first stroke switch (SW1). More specifically, a photometer 105 measures the object's brightness and a focus detector 106 detects the focus (focus state detection) (e.g., by a phase difference detection method, equivalents and other methods of focus detection as known by one of ordinary relevant skill) providing focus detection information. In at least one exemplary embodiment, the camera CPU 101 can calculate the diaphragm stop of the diaphragm unit 15 and the amount of exposure (shutter speed) of the imaging device 6 on the basis of the measurement result obtained by the photometer 105. In addition, the camera CPU 101 can determine the amount and direction by which the second lens unit 2 is to be driven to bring the object into focus on the basis of the focus detection information (e.g., the amount and direction of defocusing) obtained as the result of the focus state detection. The information of the amount and direction of driving can be transmitted to the lens CPU 201. The lens CPU 201 can control the operation of each component in the lens 2.

In addition, when the camera CPU 101 receives an ON signal from a vibration isolation (IS) switch 203 provided in the lens 2, the camera CPU 101 starts to drive the fourth lens unit 14, that is, to perform shake correction control. In at least one exemplary embodiment, the lens CPU 201 receives the ON signal from the vibration isolation (IS) switch 203, and the lens CPU 201 starts to drive the fourth lens unit instead of the camera CPU 101. In at least one exemplary embodiment, when the shooting magnification is higher than a predetermined value, a parallel shake detector 108 (e.g., provided in the camera 1) detects parallel shake (e.g., shake of the object image formed on the AF sensor in the X and Y directions). The parallel shake can be determined on the basis of signals (e.g., from an AF sensor). For example, by using the displacements of the light beam (image) from the object on an AF sensor, the parallel shake can be determined. The thus detected parallel shake is transmitted to the lens CPU 201 as parallel shake information in the X and Y directions. In addition, a focal shake detector 107 detects shake in the focal direction (Z direction), that is, the amount (and direction) of focal shake displacement on the basis of variation in the focus detection information (displacements of the two images). The thus detected shake in the focal direction (focal shake) is transmitted to the lens CPU 201 as focal shake information. Likewise in at least one exemplary embodiment he parallel shake and focal shake information is transmitted to the camera CPU 101.

When an ON signal is input from the second stroke switch (SW2), the camera CPU 101 transmits a diaphragm drive command to the lens CPU 201 and sets the diaphragm stop of the diaphragm unit 15 to a calculated value. Note that at least one exemplary embodiment the lens CPU 201 issues the command to set the stop of the diaphragm 15. In yet another exemplary embodiment it is the camera CPU 101 that issues the command to set the stop of the diaphragm 15. The camera CPU 101 also transmits an exposure start command to an exposure unit 109, so that the mirrors 3 and 4 are removed from the optical path (mirror up) and the shutter is opened. In addition, the camera CPU 101 can command the imaging unit 110, including the imaging device 6, to perform photoelectric conversion of the object image, (e.g., to perform shooting).

The imaging signal from the imaging unit 110 (imaging device 6) is converted into a digital signal by a signal processor 111, and can be subjected to various correction processes, after which an image signal is output. The image signal (data) can be recorded and stored in a recording medium, (e.g., a semiconductor memory like a flash memory, a magnetic disc, and an optical disc, in an image memory unit 112, equivalents, and other data storage units known by one of ordinary skill in the relevant arts).

The lens contact 202 includes a signal transmission contact section for communicating signals with the camera 1 and a power contact section for receiving power from the camera 1. In at least one exemplary embodiment, if the signal transmission contact section fails but the power contact section is still active, lens correction can still take place by using values stored before the failure of the signal transmission contact section, where the functions previously performed by the camera CPU 101, are now performed by the lens CPU 201.

The vibration isolation (IS) switch 203 can be operated by the user to select whether or not to perform image shake correction control. An ON signal from the vibration IS switch 203 can also be transmitted to the camera 1 (e.g., via the lens CPU 201, or directly through the signal transmission contact section).

An angular velocity sensor 204, which is denoted by 17 in FIG. 1, can include a detecting section and a calculation output section. The detecting section can output angular velocity signals representing angular velocities in vertical shake (shake in the pitch direction) and horizontal shake (shake in the yaw direction), (i.e., angular shake of the camera system). The calculation output section can output displacement signals representing displacements (angular shake displacements) of the shake along the pitch and yaw directions to the lens CPU 201. The displacement signals can be obtained by electrically or mechanically integrating the angular velocity signals from the detecting section. The ON/OFF operation of the angular velocity sensor 204 can be controlled by a command signal from the lens CPU 201.

An acceleration sensor 205, which is denoted by 18 in FIG. 1, mechanically detects accelerations in the X, Y, and Z directions, which are perpendicular to each other. More specifically, the accelerations can be detected using inertial force generated by the shake. The signals representing the accelerations can be output to the lens CPU 201.

An acceleration/velocity calculator 206 converts the parallel shake information in the X and Y directions and the focal shake information in the Z direction input from the camera 1 into parallel and focal shake displacements in the X, Y, and Z directions in accordance with shooting magnification information (which will be described below). Then, the acceleration/velocity calculator 206 calculates parallel and focal shake velocities and parallel and focal shake accelerations from the parallel and focal shake displacements in the X, Y, and Z directions.

In at least one exemplary embodiment, the shake in the X and Y directions is regarded as the parallel shake which is free from the angular shake when the angular shake correction has already been performed.

A correction value calculator 207 compares the parallel/focal shake accelerations calculated by the acceleration/velocity calculator 206 with the accelerations represented by the signals from the acceleration sensor 205 (hereafter called sensor accelerations), and determines differences between them as the correction values for the accelerations obtained by the acceleration sensor 205. The correction values are calculated for the X, Y, and Z directions, and can be stored as the acceleration correction values for the respective directions. The acceleration correction values correspond to the gravitational acceleration components. The correction-value calculation performed by the correction value calculator 207 is repeated until an exposure operation is started in the camera 1, and the acceleration correction values are constantly updated.

A shake displacement calculator 208 improves the sensor accelerations obtained from the acceleration sensor 205 using the acceleration correction values calculated by the correction value calculator 207, and thereby reduces the gravitational acceleration components from the sensor accelerations. Then, the shake displacement calculator 208 obtains the shake velocities by integrating the improved accelerations, and then integrates the shake velocities. Thus in accordance with at least one exemplary embodiment, the parallel shake displacements, which are substantially free from the gravitational acceleration components, are calculated on the basis of the data received from the acceleration sensor 205.

In at least one exemplary embodiment, the initial shake velocities of the camera system are determined in order to calculate the shake velocities and shake displacements. Accordingly, in at least one exemplary embodiment, the shake velocities (e.g., parallel/focal shake velocities) determined by the acceleration/velocity calculator 206 are set as the initial velocities.

A shake combiner 209 determines the amount by which the fourth lens unit 14 is to be driven (shake correction values) from the parallel shake displacements calculated by the shake displacement calculator 208. The shake displacement calculator 208 calculates the parallel shake displacements on the basis of the acceleration sensor output and the angular shake displacements (pitch and yaw directions), which in turn are determined on the basis of the detection result of the angular velocity sensor 204. More specifically, the shake displacement due to the parallel shake in the X direction is combined with the shake displacement on the image plane due to the angular shake in the yaw direction. The shake displacements due to the parallel shake in the Y direction is combined with the shake displacements on the image plane due to the angular shake in the pitch direction. Then, the amount and direction by which the fourth lens unit 14 is to be driven are determined from the combined shake displacements.

A focal-shake-correction-value calculator 210 determines the amount and direction by which the second lens unit 12 is to be driven to perform focal shake correction on the basis of the focal shake displacement.

A correction drive controller 211 selectively performs shake correction control based on the angular shake and/or shake correction control based on the sum (combination) of the angular and parallel shake when the vibration IS switch 203 is turned ON. More specifically, the correction drive controller 211 can perform shake correction control based on the angular shake when the shooting magnification represented by the shooting magnification information is lower than a predetermined value. In at least one exemplary embodiment illustrated in FIG. 1, the predetermined value can be set to a value within 0.2 to 0.3, or to 0.1. If the shooting magnification is larger than the predetermined value, the correction drive controller 211 performs 1.) shake correction control based on the angular shake before exposure, and 2.) shake correction control based on the total displacements of the angular and parallel shake after the exposure.

The acceleration/velocity calculator 206, the correction value calculator 207, the shake displacement calculator 208, the shake combiner 209, the focal-shake-correction-value calculator 210, and the correction drive controller 211 are provided in the lens CPU 201.

A correction driver 212 includes an IS actuator 19 shown in FIG. 1 and a drive circuit thereof. The IS actuator 19 includes an X direction actuator (e.g., having a permanent magnet and a coil) for driving the fourth lens unit 14 in the X direction and a Y direction actuator (e.g., having a permanent magnet and a coil) for driving the fourth lens unit 14 in the Y direction. The lens 2 can have a lock mechanism for holding the fourth lens unit 14 at a position where an optical axis of the fourth lens unit 14 substantially coincides with the lens optical axis AXL. The correction driver 212 can cause the lock mechanism to lock in response to a command signal from the lens CPU 201 when the vibration IS switch 203 is turned OFF (when the shake correction is stopped), and causes the lock mechanism to unlock when the vibration IS switch 203 is turned ON (when the shake correction is operated).

A focus driver 213 drives the AF motor 16 in accordance with the information regarding the amount and direction by which the second lens unit 12 is to be driven, the information being transmitted from the camera CPU 101. In at least one exemplary embodiment, the information is transmitted from the lens CPU 201. Accordingly, autofocus driving of the second lens unit 12 is performed. In addition, in shake correction control, when the shooting magnification is higher than the above-described predetermined value, the focus driver 213 performs focal shake correction at the time when the exposure operation starts. The focal shake correction is performed by driving the AF motor 16 in accordance with the information regarding the amount and direction by which the second lens unit 12 is to be driven for the focal shake correction, the information being obtained from the focal-shake-correction-value calculator 210.

A diaphragm driver 214 is controlled by the lens CPU 201 which receives a diaphragm drive command from the camera CPU 101, and drives the diaphragm unit 15 shown in FIG. 1 to obtain an aperture corresponding to a diaphragm stop designated by the command. In at least one exemplary embodiment, the diaphragm drive command is received from the lens CPU 201.

A magnification detector 215 includes a first detector section for detecting the position of the third lens unit 13, which functions as a variator lens, a second detector section for detecting the position of the second lens unit 12, and a calculator section for calculating the shooting magnification on the basis of the position information obtained from the first and second detector sections (these sections are not shown in the figure). The information of the shooting magnification calculated in the calculator section can be transmitted to the acceleration/velocity calculator 206 and to the camera CPU 101 via the lens CPU 201.

Figure 3:
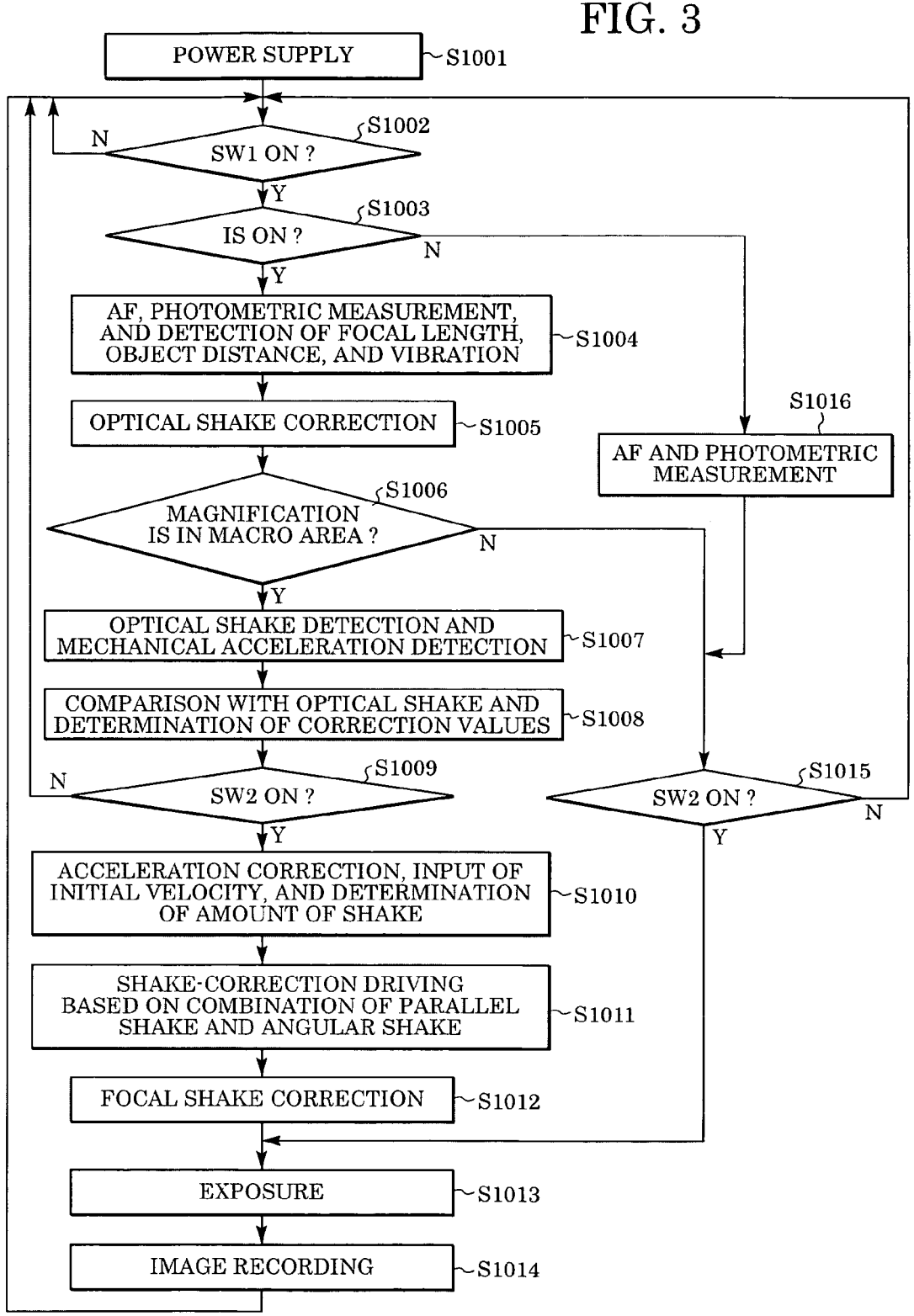
FIG. 3 illustrates a flowchart showing the main operation of a camera system in accordance with at least one exemplary embodiment.

Next, a main operation, in accordance with the least one exemplary embodiment of the system shown in FIG. 2 will be described below with reference to a flowchart illustrated in FIG. 3.

First, the power switch 103 turns on power to the camera electric circuit 100, power is also supplied to the lens electric circuit 200, and communication between the camera CPU 101 and the lens CPU 201 is started (Step (abbreviated as S in FIG. 3) 1001).

Next, the camera CPU 101 checks whether or not an ON signal is output from SW1 in the release switch 104 (Step 1002). When the ON signal is generated, the lens CPU 201 checks whether or not the vibration IS switch 203 is turned ON (Step 1003). The process proceeds to Step 1004 when the vibration IS switch 203 is turned ON, and to Step 1016 when the vibration IS switch 203 is not turned ON.

In Step 1004, the camera CPU 101 performs photometric measurement and focus detection. In addition, the lens CPU 201 performs focusing on the basis of the result of focus detection, and starts the angular shake detection. In addition, the positions of the second and third lens units 12 and 13 (i.e., the focal length and the object distance) are detected.

Then, after a predetermined time interval, the lens CPU 201 (e.g., the correction drive controller 211 in the lens CPU 201) receives the detection result of the angular shake and starts the shake correction control of the fourth lens unit 14 using the correction driver 212 (Step 1005).

In addition, the lens CPU 201 determines whether or not the current shooting magnification calculated by the magnification detector 215, from the focal length and the object distance detected in Step 1004, is higher than the predetermined value. In other words, it is determined whether or not the current shooting magnification is in the macro area where a parallel shake correction and the focal shake correction would be advisable (Step 1006). If it is determined that the shooting magnification is in the macro area, the parallel shake (X and Y directions) can be detected using the AF sensor in the camera 1, and the focal shake (Z direction) is determined on the basis of the focus detection information.

Contemporaneously, the lens 2 starts detecting the accelerations in the X, Y, and Z direction using the acceleration sensor 205 in the three-axis directions (Step 1007). In addition, the parallel/focal shake velocities and the parallel/focal shake accelerations in the three directions are calculated on the basis of the parallel and focal shake displacements in the X, Y, and Z directions detected by the AF sensor in the camera 1. Then, the correction values (e.g., gravitational acceleration components) for the sensor accelerations are calculated by comparing the calculated parallel and focal accelerations with the sensor accelerations detected by the acceleration sensor 205 in the lens 2 (Step 1008). This operation is repeated and the correction values are constantly updated until SW2 in the release switch 104 is turned ON in Step 1009.

In Step 1009, it is determined whether or not an ON signal is input from SW2 by the second stroke operation of the release switch 104. Steps 1002 to 1008 are repeated until the ON signal is input. When the ON signal is input from SW2, the process proceeds to Step 1010.

In Step 1010, the lens CPU 201 starts parallel shake correction and focal shake correction. A procedure in accordance with at least one exemplary embodiment is described below, which can occur before the exposure operation.

First, the accelerations (sensor accelerations) obtained by the acceleration sensor 205 are improved using the above-described correction values so as to reduce the gravitational acceleration components. Next, the shake velocities are calculated by integrating the improved accelerations, and the shake displacements are calculated by integrating the calculated shake velocities. In the calculation of the shake velocities, the shake velocities obtained from the AF sensor in the camera can be used as the initial velocities.

Next, in Step 1011, the amount by which the fourth lens unit 14 is to be driven (e.g., the amount by which the IS actuator 19 is to be driven) for the shake correction is determined on the basis of the parallel shake displacements, which in turn is based on the output from the above-described acceleration sensor 205 and the angular shake displacements (pitch and yaw directions). The angular shake displacements can be obtained from the detection result of the angular velocity sensor 204.

More specifically, the shake displacement due to the parallel shake in the X direction can be combined with the shake displacement on the image plane due to the angular shake in the yaw direction. Similarly, the shake displacement due to the parallel shake in the Y direction can be combined with the shake displacement on the image plane due to the angular shake in the pitch direction. Then, the amount of drive of the fourth lens unit 14 can be determined from the combined shake displacements. Thus, the fourth lens unit 14 is driven on the basis of the displacements caused by the combination of the parallel and angular shake.

In Step 1012, the lens CPU 201 (focal-shake-correction-value calculator 210) calculates the amount (lens unit 12 driving amount) by which the second lens unit 12 is to be driven for the focal shake correction on the basis of the focal shake displacement. The lens CPU 201 drives the second lens unit 12 using the correction driver 212 and the AF motor 16 on the basis of the lens unit 12 driving amount.

Next, in Step 1013, the camera CPU 101 starts the exposure operation of the imaging device 6. The lens CPU 201 continues the correction of the angular shake, the parallel shake, and the focal shake during the exposure. After the exposure, the process proceeds to Step 1014, where the camera CPU 101 records the obtained image data on the recording medium. Then, the process returns to Step 1002.

If it is determined that the shooting magnification is lower than the predetermined value and is not in the macro area in Step 1006, the process proceeds to Step 1015. Accordingly, Steps 1002 to 1006 are repeated until the ON signal is input from SW2 by the second stroke operation of the release switch 104. When the ON signal is input from SW2, the process proceeds to Step 1013, where the exposure operation is performed. In at least one exemplary embodiment, the angular shake correction is performed during the exposure.

If the vibration IS switch 203 is turned OFF in Step 1003, the camera CPU 101 performs focus detection and photometric measurement in Step 1016. Then, the process proceeds to Step 1015, and Steps 1002 to 1016 are repeated until the ON signal is input from SW2 by the second stroke operation of the release switch 104. When the ON signal is input from SW2, the process proceeds to Step 1013, where the exposure operation is performed. In this particular exemplary embodiment, no shake correction is performed, although other exemplary embodiments can include shake correction.

The camera CPU 101 and the lens CPU 201 repeat the above-described steps until the power switch 103 is turned OFF. When the power switch 103 is turned OFF, the communication between the camera CPU 101 and the lens CPU 201 is finished and the power supply to the lens electric circuit 200 is turned off. In at least one exemplary embodiment, the above described steps or a portion of the above-described steps can be turned on independently of the power switch 103. For example a switch can be included that will send a signal to either the camera CPU 101 or the lens CPU 201 to start the steps, and the same switch can be used (or a separate switch) to stop the cycle of steps. Additionally in yet an additional exemplary embodiment a separate timer switch can be used to set the frequency upon which the steps are repeated.

In the present exemplary embodiment, the parallel and focal shake can be detected using the output from the AF sensor. However, at least one exemplary embodiment is not limited to this. For example, the parallel and focal shake may also be detected using the output from the imaging device 6.

In addition, in the present exemplary embodiment, the output from the AF sensor can be used for both calculating the correction values of the accelerations detected by the acceleration sensor 205 and for obtaining the initial velocities useful for calculating the velocities from the accelerations. However, in other exemplary embodiment the output from the AF sensor may also be used for only one of these purposes.

In addition, in the present embodiment, the correction of the parallel and focal shake can be started at the time when the exposure starts. However, the correction of the parallel and focal shake may also be started before the exposure starts.

In addition, in the present exemplary embodiment, the parallel shake detector 108 and the focal shake detector 107 are provided in the camera 1, while the angular velocity sensor 204, the acceleration sensor 205, and the CPU for performing the shake correction control are provided in the lens 2. However, these components may be provided in either of the camera and the lens.

For example, the angular velocity sensor and the acceleration sensor may be provided in the camera together with the parallel shake detector and the focal shake detector. In such a case, the lens CPU may receive the output signals from these sensors to perform the shake correction control. Alternatively, the parallel shake detector and the focal shake detector may be provided in the lens. In such a case, the parallel shake detector and the focal shake detector receive signals from the AF sensor in the camera to calculate the parallel and focal shake. Alternatively, the camera CPU 101 may perform a substantial portion of the calculations for shake correction and transmit a drive command (the amount and direction by which the fourth lens unit 14 is to be driven) to the lens.

In at least one exemplary embodiment, the digital single lens reflex camera with the interchangeable lens is described as an optical apparatus. However, the optical apparatus according to at least a few other exemplary embodiments may also be an interchangeable lens, a camera with an integrated lens, a video camera, other equivalent optical apparatus and image viewing and/or recording devices as known by one of ordinary relevant skill in the art.

In addition, in the present embodiment, a so-called optical vibration isolation is performed. However, the present embodiment may also be applied to the case of an electronic vibration isolation in which the image signal obtained by the imaging device is shifted in accordance with vibration.

While the present invention has been described with reference to exemplary embodiments, it is to be understood that the invention is not limited to the disclosed embodiments. On the contrary, exemplary embodiments are intended to cover various modifications and equivalent arrangements included within the spirit and scope of the appended claims, specification, figures, and as known by one of ordinary skill in the relevant art. The scope of the following claims is to be accorded the broadest interpretation so as to encompass all such modifications and equivalent structures and functions.

This application claims priority from Japanese Patent Application No. 2004-177301 filed Jun. 15, 2004, which is hereby incorporated herein in its entirety.

What is claimed is:

1. An optical apparatus comprising:
a shake correction unit; and
a controller configured to generate, using a first signal and a second signal, shake information, the first signal being obtained by detecting an acceleration of a vibration and the second signal being obtained by detecting a displacement of the vibration,
wherein the shake correction unit uses the shake information to improve image shake,
wherein the first signal is generated using an inertial force generated by the vibration and the second signal is generated by detecting a displacement of a light beam caused by the vibration, and
wherein the controller determines a shake velocity and a shake displacement on the basis of a shake acceleration represented by the first signal and an initial shake velocity set on the basis of the second signal.

2. The optical apparatus according to claim 1, wherein the controller improves a first shake acceleration using the second signal resulting in a first improved first shake acceleration, the first shake acceleration being represented by the first signal, and wherein the controller generates the shake information on the basis of the first improved first shake acceleration.

3. The optical apparatus according to claim 2, wherein the controller improves the first improved first shake acceleration using a correction value for minimizing a gravitational acceleration component from the first improved first shake acceleration resulting in a second improved first shake acceleration, the correction value being determined on the basis of a difference between the first improved first shake acceleration and a second shake acceleration which is calculated on the basis of the second signal.

4. The optical apparatus according to claim 3, wherein the correction value used for correcting the first improved first shake acceleration during shooting is determined before shooting.

5. The optical apparatus according to claim 1, wherein the second signal corresponds to a vibration in a direction substantially parallel to an image plane.

6. The optical apparatus according to claim 1, wherein the second signal corresponds to a vibration in a direction substantially parallel to a shooting optical axis.

7. The optical apparatus according to claim 1, wherein the controller detects a shooting magnification and generates the shake information using the first signal and the second signal when the shooting magnification is higher than a predetermined value.

8. The optical apparatus according to claim 1, wherein the second signal corresponds to a vibration in a direction substantially parallel to an image plane, and wherein the shake correction unit includes an optical element moveable in a direction different from a direction along a shooting optical axis.

9. The optical apparatus according to claim 1, wherein the second signal corresponds to a vibration in a direction substantially parallel to a shooting optical axis, and
wherein the shake correction unit includes an optical element moveable in a direction along the shooting optical axis.

10. The optical apparatus according to claim 1, further comprising a first detector which outputs the first signal.

11. The optical apparatus according to claim 10, wherein the first detector is disposed on a plane, wherein the plane is perpendicular to an optical axis of an optical system and includes a principal point of the optical system.

12. The optical apparatus according to claim 1, further comprising a second detector, which outputs the second signal.

13. The optical apparatus according to claim 12, wherein the second detector is a focus detection device, which detects the state of focus of an optical system.

14. The optical apparatus according to claim 1, wherein the shake correction unit and controller are sub elements of a lens apparatus.

15. A shooting system comprising:
the lens apparatus according to claim 14; and
a camera to which the lens apparatus is detachably attached.

16. An optical vibration correction method in an optical system including at least a first lens unit, the method comprising:
measuring the photometric environment of the optical system used to view an object;
measuring the focus qualities of an image of the object in the optical system;
measuring an angular shake amount;
calculating the angular shake correction value;
decreasing the angular shake by moving the first lens unit by an amount related to the angular shake correction value;
measuring parallel and focal shake displacements in the X, Y, and Z directions, where X,Y,Z are orthogonal axes;
correcting the measured parallel and focal shake displacements for gravitational acceleration; and
moving a second lens unit based on the corrected parallel and focal shake displacements to improve the parallel and focal shake of the image, wherein the second lens unit is included in the optical apparatus.

17. The method of claim 16, wherein the focus qualities include one of the focal length and the object distance.

18. An optical apparatus comprising:
a shake correction unit; and
a controller configured to generate, using a first signal and a second signal, shake information, the first signal being obtained by detecting an acceleration of a vibration and the second signal being obtained by detecting a displacement of the vibration,
wherein the shake correction unit uses the shake information to improve image shake,
wherein the first signal is generated using an inertial force generated by the vibration and the second signal is generated by detecting a displacement of a light beam caused by the vibration,
wherein the controller improves a first shake acceleration using the second signal resulting in a first improved first shake acceleration, the first shake acceleration being represented by the first signal,
wherein the controller generates the shake information on the basis of the first improved first shake acceleration,
wherein the controller improves the first improved first shake acceleration using a correction value for minimizing a gravitational acceleration component from the first improved first shake acceleration resulting in a second improved first shake acceleration, the correction value being determined on the basis of a difference between the first improved first shake acceleration and a second shake acceleration which is calculated on the basis of the second signal, and
wherein the correction value used for correcting the first improved first shake acceleration during shooting is determined before shooting.

19. An optical apparatus comprising:
a shake correction unit; and
a controller configured to generate, using a first signal and a second signal, shake information, the first signal being obtained by detecting an acceleration of a vibration and the second signal being obtained by detecting a displacement of the vibration,
wherein the shake correction unit uses the shake information to improve image shake,
wherein the first signal is generated using an inertial force generated by the vibration and the second signal is generated by detecting a displacement of a light beam caused by the vibration, and
wherein the controller detects a shooting magnification and generates the shake information using the first signal and the second signal when the shooting magnification is higher than a predetermined value.

* * * * *